United States Patent
Tsujita et al.

(10) Patent No.: US 10,478,027 B2
(45) Date of Patent: Nov. 19, 2019

(54) TOILET SEAT DEVICE AND TOILET DEVICE EQUIPPED THEREWITH

(71) Applicant: TOTO LTD., Kitakyushu-shi, Fukuoka (JP)

(72) Inventors: Masami Tsujita, Kitakyushu (JP); Shoichi Tsuiki, Kitakyushu (JP); Yuta Tanogashira, Kitakyushu (JP)

(73) Assignee: TOTO LTD., Kitakyushu-Shi, Fukuoka (JP)

(*) Notice: Subject to any disclaimer, the term of this patent is extended or adjusted under 35 U.S.C. 154(b) by 0 days.

(21) Appl. No.: 15/431,935

(22) Filed: Feb. 14, 2017

(65) Prior Publication Data

US 2017/0231442 A1  Aug. 17, 2017

(30) Foreign Application Priority Data

Feb. 15, 2016 (JP) ................. 2016-026298

(51) Int. Cl.
  *A47K 13/24* (2006.01)
  *E03D 5/10* (2006.01)
  *G01S 13/56* (2006.01)
  *G01S 13/88* (2006.01)

(52) U.S. Cl.
  CPC .............. *A47K 13/24* (2013.01); *E03D 5/105* (2013.01); *G01S 13/56* (2013.01); *G01S 13/88* (2013.01)

(58) Field of Classification Search
  CPC ................................ E03D 5/105; A47K 13/24
  See application file for complete search history.

(56) References Cited

U.S. PATENT DOCUMENTS

| | | | | |
|---|---|---|---|---|
| 4,141,091 A | * | 2/1979 | Pulvari | E03D 5/105 361/179 |
| 2005/0114992 A1 | * | 6/2005 | Todoroki | E03D 3/00 4/313 |
| 2010/0306910 A1 | * | 12/2010 | Chen | A47K 13/10 4/246.1 |
| 2014/0123378 A1 | * | 5/2014 | Luettgen | B23P 19/00 4/406 |
| 2017/0016221 A1 | * | 1/2017 | Yamamoto | A47K 13/24 |
| 2017/0241118 A1 | * | 8/2017 | Denzin | B23P 19/00 |
| 2017/0276781 A1 | * | 9/2017 | Todoroki | G01S 13/56 |

OTHER PUBLICATIONS

English translation of Japanese Publication No. 2006-112163, dated Apr. 27, 2006 in the name of TOTO Ltd.

* cited by examiner

*Primary Examiner* — J C Jacyna
(74) *Attorney, Agent, or Firm* — Pearne & Gordon LLP

(57) ABSTRACT

According to one embodiment, a toilet seat device includes a toilet seat, and a Doppler sensor using radio waves. An opened state of the toilet seat is sensed when approach of a user to the toilet seat is sensed based on a sensing signal outputted by the Doppler sensor. It is regarded that use is in progress for urination by the user when the toilet seat is in the opened state. In a state of being regarded that use is in progress for urination, a post-use operation is performed after sensing leaving of the user from the toilet seat based on the sensing signal.

8 Claims, 13 Drawing Sheets

TOILET SEAT DEVICE AND TOILET DEVICE EQUIPPED THEREWITH

CROSS-REFERENCE TO RELATED APPLICATIONS

This application is based upon and claims the benefit of priority from Japanese Patent Application No. 2016-026298, filed on Feb. 15, 2016; the entire contents of which are incorporated herein by reference.

FIELD

Embodiments of the invention are generally related to a toilet seat device and a toilet device equipped therewith.

BACKGROUND

Conventionally, a toilet seat device for flushing a toilet stool may be provided with a human body sensor for sensing e.g. a user of the toilet stool. A commonly known example of the human body sensor is a photoelectric sensor.

However, installation of a photoelectric sensor requires providing a translucent window part in e.g. the surface or other location of the toilet seat device and embedding the photoelectric sensor so as to face the window part. Thus, the toilet seat device is defiled by the window part. Furthermore, a structure interrupting the light projection of the sensor cannot be provided in front of the window part of the photoelectric sensor. Moreover, the light projection part of the photoelectric sensor necessarily needs to be provided behind the window part. Such conditions cause the problem of e.g. limiting the flexibility of design of the toilet seat device, toilet stool, and other devices.

To solve this problem, there is proposed a human body sensing device using a Doppler sensor for human body sensing (e.g., Japanese Unexamined Patent Publication No. 2002-70119). Radio waves transmitted by the Doppler sensor can pass through e.g. resin. Thus, for instance, the Doppler sensor can be installed in the state of being hidden inside e.g. the toilet seat device. This can dispense with the window part required for the photoelectric sensor.

Furthermore, use of the Doppler sensor enables sensing the approaching motion of a human body and the leaving motion of a human body.

However, the human body sensing device using a Doppler sensor only determines the approaching motion of a human body and the leaving motion of a human body. It may fail to sense the presence of a human body when the human body comes to rest.

In particular, when a male user approaches a toilet stool to urinate, the user is in an almost stationary state during urination. Thus, the human body sensing device using a Doppler sensor causes the problem of malfunctions such as closing the toilet lid and flushing the toilet stool although being used by the user.

To solve this problem, there is known a toilet facility (toilet device) using a Doppler sensor with a plurality of amplifiers (e.g., Japanese Patent No. 4402406). When the toilet lid of the toilet stool is opened, the toilet facility switches the sensing sensitivity of the Doppler sensor to high sensitivity by switching to an amplifier of high gain and high sensitivity from among the plurality of amplifiers. This enables successfully sensing a human body even when the (male) user is in an almost stationary state for urination.

However, even if the sensitivity of the Doppler sensor is switched to high sensitivity as in the toilet facility of the aforementioned Japanese Patent No. 4402406, the state of little motion is difficult to sense and distinguish from the state of absence of a human body. Furthermore, because of the high sensitivity, the Doppler sensor is prone to generation of noise. This causes concern about malfunctions such as closing the toilet lid and flushing the toilet stool although being used by the user.

Furthermore, the need to use a plurality of amplifiers complicates the control circuit or sensor circuit. This also causes concern about increasing the load of the control section.

As a method to solve this problem, it is considered to determine that the user is present from the time of sensing the approaching motion of a human body until the time of sensing the leaving motion of a human body. However, for instance, the user may conduct a leaving motion directly after approaching the toilet facility without using it. In this case, there is concern about the occurrence of waste water caused by operations such as flushing the toilet stool although the toilet facility is not used.

SUMMARY

According to one embodiment, a toilet seat device includes a toilet seat, and a Doppler sensor using radio waves. An opened state of the toilet seat is sensed when approach of a user to the toilet seat is sensed based on a sensing signal outputted by the Doppler sensor. It is regarded that use is in progress for urination by the user when the toilet seat is in the opened state. In a state of being regarded that use is in progress for urination, a post-use operation is performed after sensing leaving of the user from the toilet seat based on the sensing signal.

DETAILED DESCRIPTION

Figure 1:
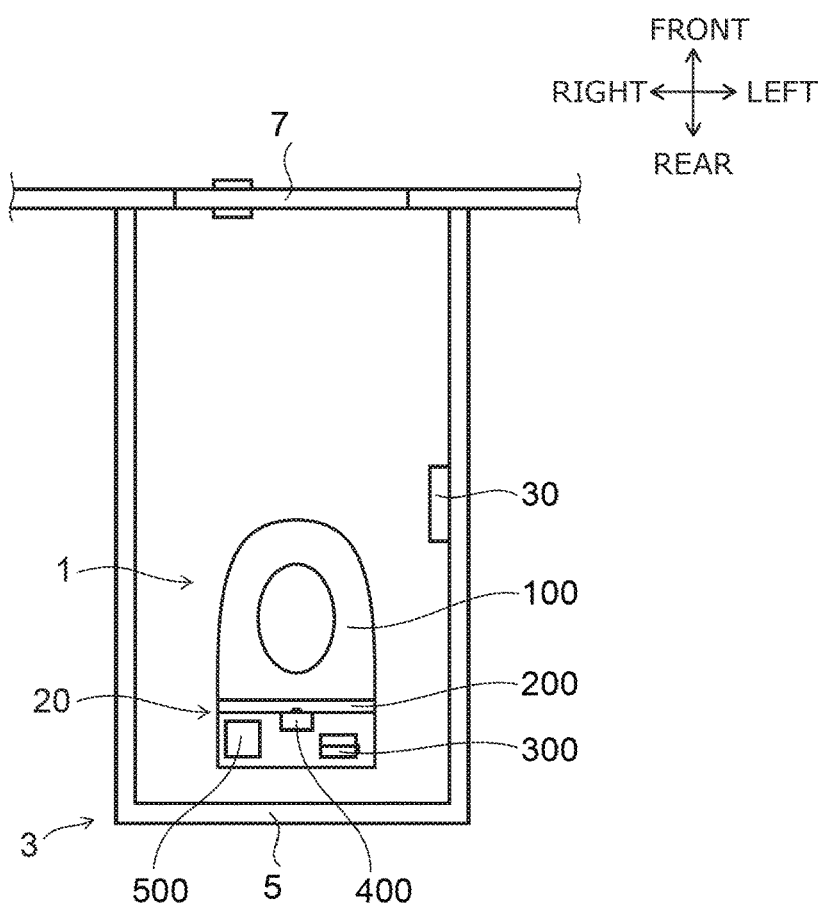
FIG. 1 is a plan view showing a toilet room in which a toilet device equipped with a toilet seat device according to an embodiment of the invention is installed.

A toilet seat device according to an aspect of the invention includes a toilet seat, and a Doppler sensor using radio waves. An opened state of the toilet seat is sensed when approach of a user to the toilet seat is sensed based on a sensing signal outputted by the Doppler sensor. It is regarded that use is in progress for urination by the user when the toilet seat is in the opened state. In a state of being regarded that use is in progress for urination, a post-use operation is performed after sensing leaving of the user from the toilet seat based on the sensing signal According to this configuration, it is regarded that use is in progress for urination by the user when the toilet seat is in the opened state. A post-use operation is performed after sensing leaving of the user from the toilet seat based on the sensing signal. Thus, the sensing information of the Doppler sensor is not used to determine whether use is in progress. This can suppress malfunctions such as closing the toilet seat during use for urination by the user and flushing the toilet stool without use by the user due to erroneous sensing of the Doppler sensor.

In a toilet seat device according to an aspect of the invention, preferably, a closed state of the toilet seat is sensed when approach of the user to the toilet seat is sensed based on the sensing signal outputted by the Doppler sensor. Seating of the user is sensed when the toilet seat is in the closed state. When it is sensed that the user is seated, the post-use operation is performed after sensing unseating of the user and leaving of the user from the toilet seat based on the sensing signal.

According to this configuration, seating of the user is sensed when the toilet seat is in the closed state. When seating of the user is sensed, the post-use operation is performed after sensing unseating of the user and leaving of the user from the toilet seat based on the sensing signal. Thus, the toilet seat device can be operated in accordance with the motion of the user. Accordingly, the user can use the toilet seat device more comfortably.

In a toilet seat device according to an aspect of the invention, preferably, at least one of the opened state and a closed state of the toilet seat is sensed after a prescribed period of time after approach of the user to the toilet seat is sensed based on the sensing signal outputted by the Doppler sensor.

According to this configuration, for example, the opened state of the toilet seat is sensed after a prescribed period of time after approach of the user to the toilet seat is sensed based on the sensing signal outputted by the Doppler sensor. Thus, for instance, in the case where the toilet seat has already been in the opened state when the user approaches it, the toilet seat device can be operated in accordance with one of use of the toilet seat as opened and use of the toilet seat after being closed. Accordingly, the user can use the toilet seat device more comfortably.

In a toilet seat device according to an aspect of the invention, preferably, the opened state of the toilet seat is a state in which the toilet seat is opened from the closed state after approach of the user to the toilet seat is sensed based on the sensing signal outputted by the Doppler sensor.

According to this configuration, the opened state of the toilet seat is a state in which the toilet seat is opened from the closed state after approach of the user to the toilet seat is sensed based on the sensing signal outputted by the Doppler sensor. Thus, urination of the user can be sensed more accurately. This can further suppress malfunctions such as closing the toilet lid and flushing the toilet stool due to erroneous sensing of the Doppler sensor.

In a toilet seat device according to an aspect of the invention, preferably, the opened state of the toilet seat is sensed, and if it is regarded that use is in progress for urination by the user when the toilet seat is in the opened state, then sensing sensitivity of the Doppler sensor is maintained or lowered, and a formal determination is performed to determine whether use is in progress by the user again based on the sensing signal of the Doppler sensor.

According to this configuration, after the opened state of the toilet seat is sensed, sensing is further performed with the sensitivity of the Doppler sensor maintained or lowered. This can confirm that the user (human body) is present near the toilet seat (or has come nearer to the toilet seat) after the opened state of the toilet seat is sensed. Thus, urination of the user can be determined more accurately. This can further suppress malfunctions such as closing the toilet seat during use for urination by the user and flushing the toilet stool without use by the user.

In a toilet seat device according to an aspect of the invention, preferably, the post-use operation is an operation of closing the toilet seat.

According to this configuration, the toilet seat is closed immediately after the user uses and leaves the toilet seat device. This spares the next user the operation of closing the toilet seat. Accordingly, the user can use the toilet seat device more comfortably.

The invention is a toilet device including a toilet stool and the toilet seat device.

According to this configuration, the toilet device including a toilet stool and the toilet seat device can suppress malfunctions such as closing the toilet seat during use for urination by the user and flushing the toilet stool without use by the user.

Embodiments of the invention will now be described with reference to the accompanying drawings. In the drawings, similar components are labeled with like reference numerals, and the detailed description thereof is omitted appropriately.

<Configuration of the Toilet Device>

First, a toilet device equipped with a toilet seat device according to an embodiment of the invention is described with reference to FIGS. 1 to 3.

The following description refers to the directions shown in the figures. Here, in this specification, "above" as viewed by a user sitting on a toilet seat is taken as "upward;" and "below" as viewed by the user sitting on the toilet seat is taken as "downward." The "front" as viewed by the user sitting on the toilet seat with the back of the user facing a toilet lid in the open state is taken as "frontward;" and the "rear" as viewed by the user sitting on the toilet seat is taken as "rearward." The right side as viewed by the user standing in front of a toilet facing rearward is taken as "rightward;" and the left side as viewed by the user standing in front of the toilet facing rearward is taken as "leftward."

FIG. 1 is a plan view showing a toilet room in which a toilet device equipped with a toilet seat device according to an embodiment of the invention is installed. FIG. 2 is a side view showing the toilet room in which the toilet device equipped with the toilet seat device according to the embodiment of the invention is installed. FIG. 3 is a perspective view of the toilet device equipped with the toilet seat device according to the embodiment of the invention.

Figure 2:
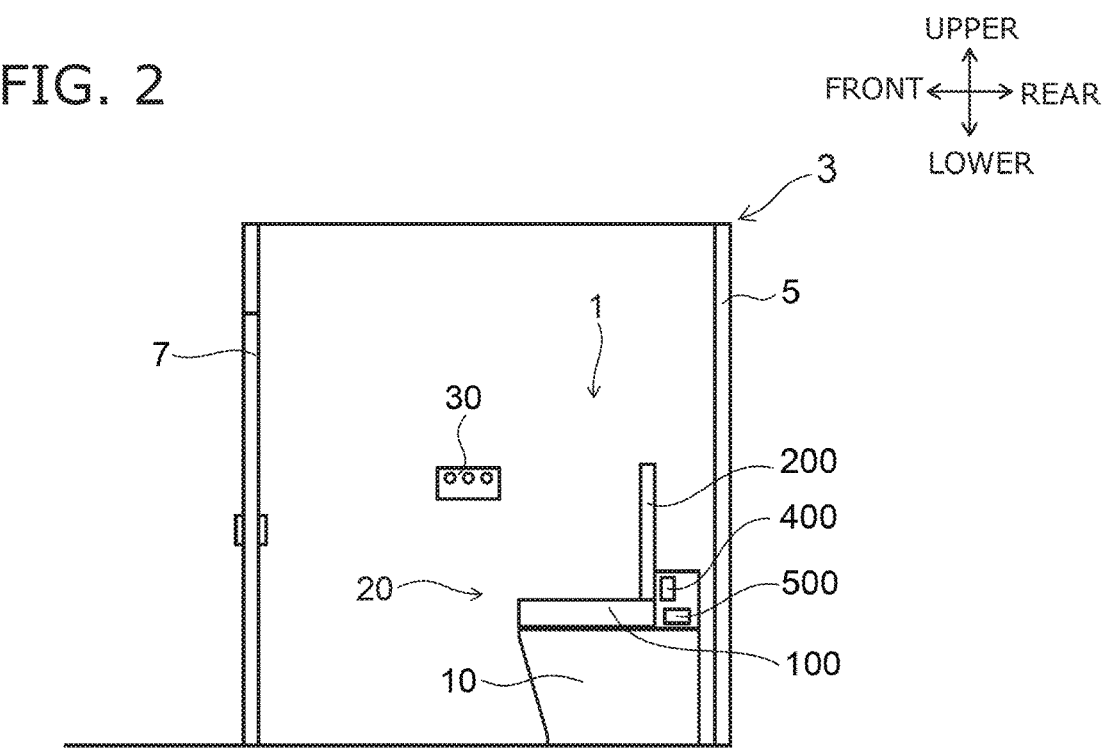
FIG. 2 is a side view showing the toilet room in which the toilet device equipped with the toilet seat device according to the embodiment of the invention is installed.
Figure 3:
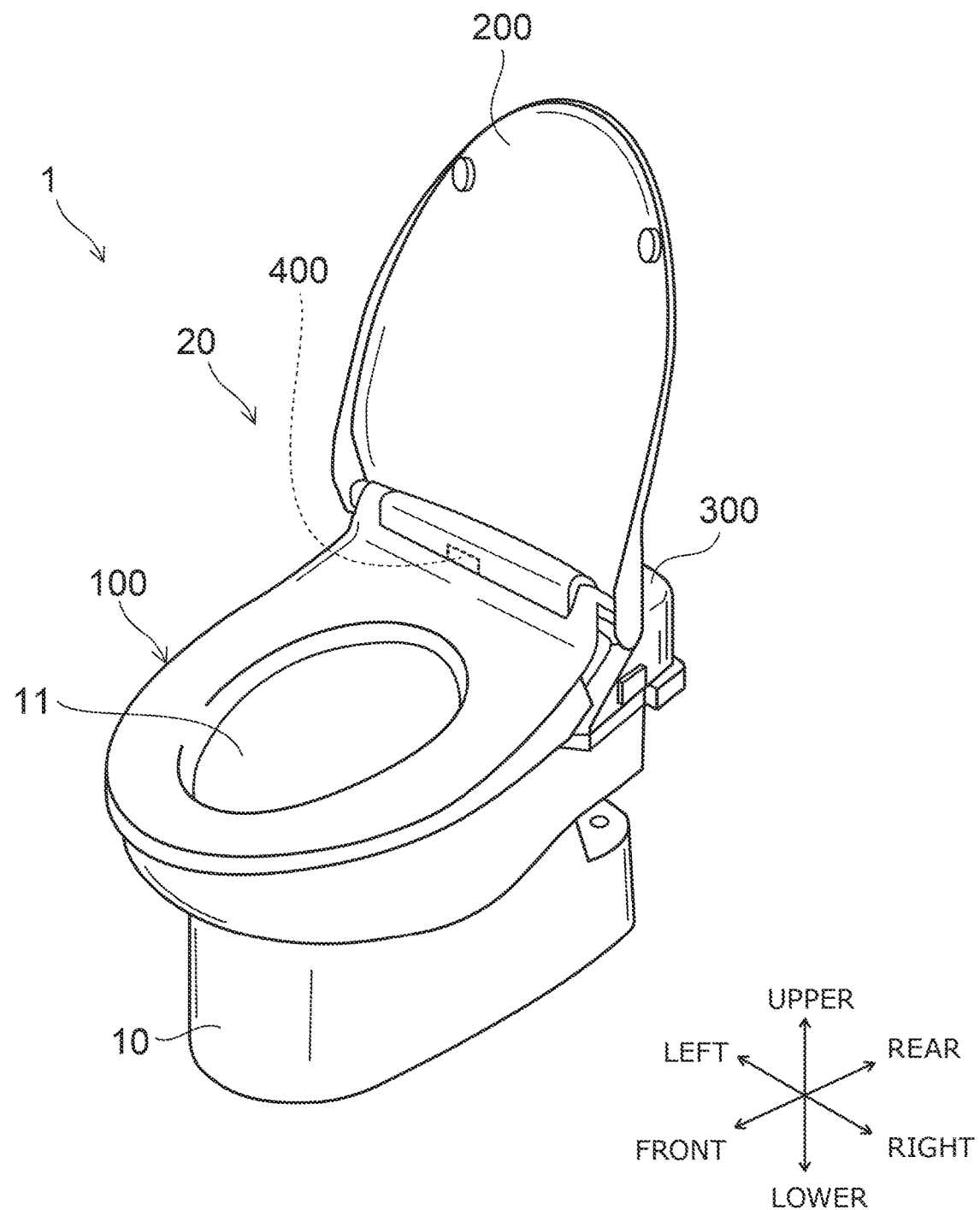
FIG. 3 is a perspective view of the toilet device equipped with the toilet seat device according to the embodiment of the invention.

As shown in FIGS. 1 to 3, the toilet device 1 is installed inside the toilet room 3. The toilet room 3 is a space surrounded with walls 5 on the four sides and a door 7 provided in the front wall 5. The user of the toilet device 1, for instance, opens the door 7, enters the toilet room 3, and then closes the door 7 to use the toilet device 1. Alternatively, when not in use, the toilet room 3 is in the state in which the door 7 is opened. The user enters the toilet room 3 and then closes the door 7 to use the toilet device 1.

The toilet device 1 includes is a toilet stool 10 of what is called a sit-down toilet stool, a toilet seat device 20 (described later in detail) provided above the toilet stool 10, and a remote control device (remote controller) 30. A bowl part 11 for receiving dirt or urine of the user is formed in the toilet stool 10. A sidewall (wall 5 on a lateral side) in the toilet room 3 is provided with e.g. the remote control device 30. The toilet seat device 20 is made operable by this remote control device 30.

The toilet seat device 20 includes a toilet seat 100, a toilet lid 200, and a casing 300.

The toilet seat 100 and the toilet lid 200 are pivotally supported on the casing 300 in an openable/closable manner. Here, when the toilet seat 100 is closed, the toilet seat 100 is provided so as to cover the upper rim part of the bowl part 11. When the toilet lid 200 is closed, the toilet lid 200 is provided so as to cover the upper surface of the toilet seat 100 and the inside of the bowl part 11.

<Configuration of the Toilet Seat Device>

Next, a toilet seat device according to an embodiment of the invention is described in detail with reference to FIGS. 4 to 6.

Figure 4:
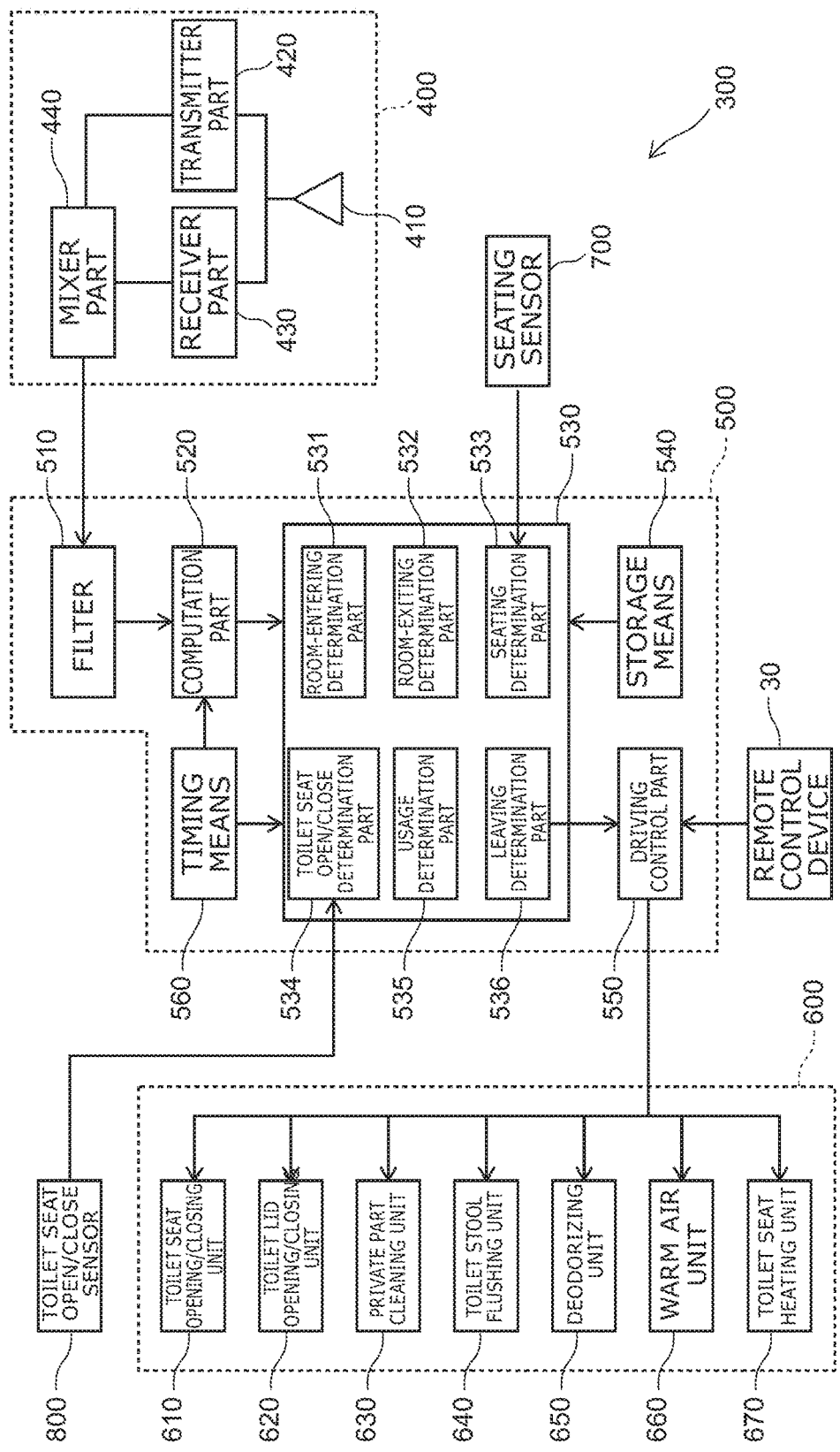
FIG. 4 is a block diagram showing the main configuration of the toilet seat device according to an embodiment of the invention.

FIG. 4 is a block diagram showing the main configuration of the toilet seat device according to an embodiment of the invention. FIG. 5 is an illustrative view showing transmission waves emitted from a Doppler sensor according to an embodiment of the invention. FIG. 6 is a conceptual view showing the reflection of the Doppler sensor according to the embodiment of the invention.

As shown in FIG. 4, a Doppler sensor 400, a control section 500, a controlled section 600, a seating sensor 700, and a toilet seat open/close sensor 800 are provided inside the casing 300.

The Doppler sensor 400 emits high-frequency radio waves such as microwaves or millimeter waves toward a prescribed sensing region to sense a sensing target such as a human body having entered the sensing region. The Doppler sensor 400 can sense the motion (velocity) of the sensing target using the Doppler effect. When the Doppler sensor 400 senses the motion of the sensing target, a sensing signal thereof is outputted to the control section 500.

The Doppler sensor 400 includes an antenna part 410, a transmitter part 420, a receiver part 430, and a mixer part 440. High-frequency radio waves such as microwaves and millimeter waves in the frequency band of 10 [kHz] to 100 [GHz] are emitted from the antenna part 410 connected to the transmitter part 420.

Figure 5:
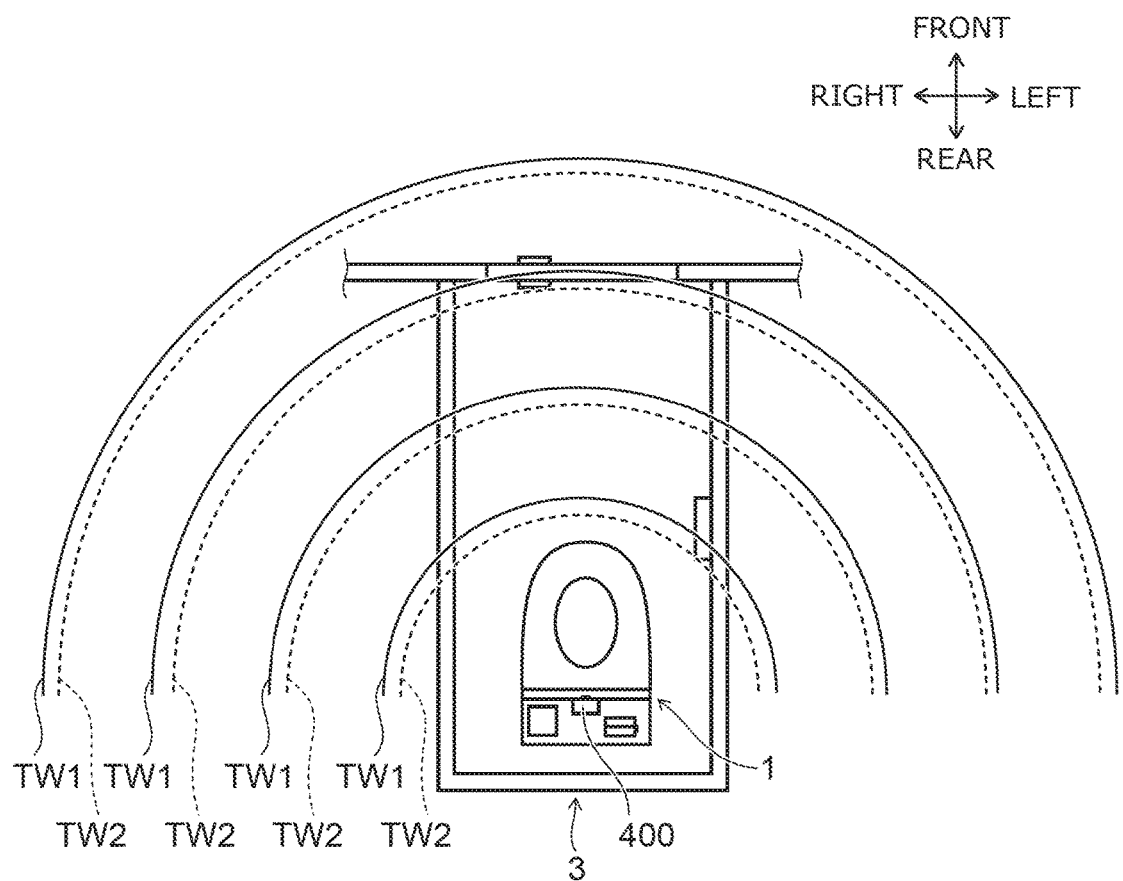
FIG. 5 is an illustrative view showing transmission waves emitted from a Doppler sensor according to an embodiment of the invention.

As shown in FIG. 5, radio waves (transmission waves TW) emitted from the Doppler sensor 400 spread e.g. concentrically about the Doppler sensor 400. Here, the Doppler sensor 400 can be provided with directivity so that e.g. the intensity of radio waves emitted forward from the toilet seat device 20 is higher than the intensity of radio waves emitted toward the other directions. In this embodiment, as shown in FIG. 5, the Doppler sensor 400 is configured as a two-wave Doppler sensor such that a first transmission wave TW1 and a second transmission wave TW2 are emitted from the Doppler sensor 400. The first transmission wave TW1 and the second transmission wave TW2 are out of phase with each other by e.g. $\lambda/4$. Alternatively, the phases of two signals can be shifted from each other by e.g. the following method. Inside the Doppler sensor 400, two reception signals are generated from one reception wave. The phase of one signal can be shifted from the phase of the other signal. By adopting the configuration of the two-wave Doppler sensor, it can be discriminated whether the object (sensing target) is approaching or leaving based on the phase difference between the Doppler signals generated respectively from two transmission waves.

Figure 6:
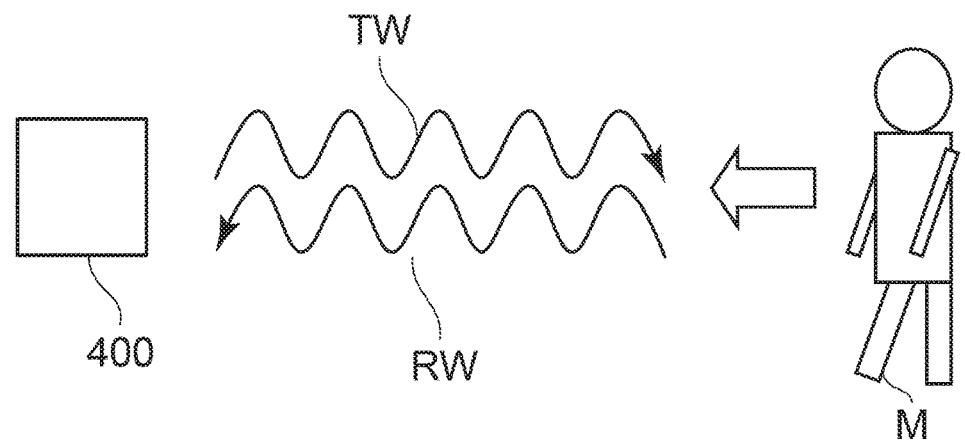
FIG. 6 is a conceptual view showing the reflection of the Doppler sensor according to the embodiment of the invention.

As shown in FIG. 6, a transmission wave TW transmitted from the antenna part 410 of the Doppler sensor 400 is reflected by a sensing target such as a human body M. Then, the reflection wave RW is inputted to the receiver part 430 through the antenna part 410 of the Doppler sensor 400. Part of the transmission wave emitted from the transmitter part 420 through the antenna part 410 and the reception wave inputted to the receiver part 430 through the antenna part 410 are inputted to the mixer part 440 and combined to generate a sensing signal (see FIG. 4). The sensing signal generated by the mixer part 440 is outputted to the control section 500.

Here, the sensing signal generated by the mixer part 440 contains a signal reflecting the Doppler effect. More specifically, when a sensing target such as a human body moves, the wavelength of the reflection wave is shifted by the Doppler effect. The Doppler frequency $\Delta F$ [Hz] can be represented by the following equation (1).

$$\Delta F = Fs - Fb = 2 \times Fs \times (v/c) \qquad (1)$$

where
Fs: frequency of the transmission wave
Fb: frequency of the reflection wave
v: moving velocity of the object (sensing target)
c: speed of light ($=300 \times 10^6$ [m/s]))

When the sensing target moves relative to the Doppler sensor 400, an output signal including the frequency $\Delta F$ proportional to its velocity v is obtained as represented by equation (1). In other words, the moving velocity v of the object (sensing target) can be determined by measuring the Doppler frequency $\Delta F$.

Returning to FIG. 4, the control section 500 receives a sensing signal outputted from the Doppler sensor 400, a signal from the seating sensor 700, a signal from the toilet seat open/close sensor 800, and a signal from the remote control device 30. Then, the control section 500 controls the controlled section 600 to perform a prescribed operation. The control section 500 includes a filter 510, a computation part 520, a determination part 530, a storage means 540, a driving control part 550, and a timing means 560.

The filter 510 removes the frequency components other than e.g. the band necessary for detecting a human body. The sensing signal outputted from the mixer part 440 to the control section 500 is first inputted to the filter 510 of the control section 500. The sensing signal filtered by the filter 510 is outputted to the computation part 520. The filtering frequency in this process is e.g. 200 [Hz]. The frequency components of 200 [Hz] or more are removed.

The computation part 520 computes and analyzes the sensing signal from which the prescribed frequency components have been removed by the filter 510. The computation result of the computation part 520 is outputted to the determination part 530. The signals from the timing means 560, the seating sensor 700, and the toilet seat open/close sensor 800 described later are also outputted to the determination part 530.

Here, the determination part 530 includes a room-entering determination part 531, a room-exiting determination part 532, a seating determination part 533, a toilet seat open/close determination part 534, a usage determination part 535, and a leaving determination part 536.

The room-entering determination part 531 determines whether or not a sensing target such as a human body has entered the toilet room 3 based on the computation result of the computation part 520. The room-exiting determination part 532 determines whether or not a sensing target such as a human body inside the toilet room 3 has exited from inside the toilet room 3 based on the computation result of the computation part 520. Specifically, a prescribed threshold stored in the storage means 540 described later is retrieved and compared with the computation result of the computation part 520. Then, based on this comparison result, the room-entering determination part 531 and the room-exiting determination part 532 determine entry into the toilet room 3 and exit from inside the toilet room 3.

The seating determination part 533 determines whether or not a human body is seated on the toilet seat 100 based on the signal from the seating sensor 700 described later.

The toilet seat open/close determination part 534 determines whether the toilet seat 100 is in the opened state or the closed state based on the signal from the toilet seat open/close sensor 800 described later. The usage determination part 535 determines whether or not the toilet device 1 has been used based on the determination result of the toilet seat open/close determination part 534 or the usage determination part 535. Then, a command signal is outputted to the driving control part 550 based on the results determined by the respective parts of the determination part 530.

The leaving determination part 536 determines whether or not a sensing target such as a human body has left the toilet seat 100 by a prescribed distance inside the toilet room 3 based on the computation result of the computation part 520.

The storage means 540 is what is called a memory, and stores a prescribed threshold. The prescribed threshold stored in the storage means 540 is retrieved by the determination part 530 and compared with the computation result of the computation part 520.

Upon receiving the command signal outputted from the determination part 530 or the command signal from the remote control device 30, the driving control part 550 operates the controlled section 600, described later, based on each command signal The timing means 560 is what is called a timer, and measures time. The information of time measured by the timing means 560 is outputted as a signal to e.g. the computation part 520 and the determination part 530.

The controlled section 600 includes a toilet seat opening/closing unit 610, a toilet lid opening/closing unit 620, a private part cleaning unit 630, a toilet stool flushing unit 640, a deodorizing unit 650, a warm air unit 660, and a toilet seat heating unit 670. As described above, these units are operated by the signal from the driving control part 550.

The toilet seat opening/closing unit 610 and the toilet lid opening/closing unit 620 can open/close the toilet seat 100 and the toilet lid 200. The toilet seat opening/closing unit 610 and the toilet lid opening/closing unit 620 can be controlled based on e.g. the command from the remote control device 30 and the determination result of the determination part 530.

The private part cleaning unit 630 includes a nozzle (not shown) and a nozzle motor (not shown). The private part cleaning unit 630 can be controlled based on e.g. the command of the remote control device 30. When the user operates the remote control device 30, the nozzle motor is driven to advance the nozzle into the bowl part 11. Thus, the private part cleaning unit 630 can clean the private parts of the human body by jetting wash water from the tip of the advanced nozzle.

The toilet stool flushing unit 640 can flush the bowl part 11. The toilet stool flushing unit 640 can be controlled based on e.g. the command from the remote control device 30 and the determination result of the usage determination part 535 of the determination part 530.

The deodorizing unit 650 can reduce odorous components in the bowl part 11 and the toilet room 3 through e.g. a filter or catalyst. The warm air unit 660 can blow warm air toward e.g. the private parts of the human body seated on the toilet seat 100 to dry the private parts. Furthermore, the toilet seat heating unit 670 can heat the outer surface of the toilet seat 100 by energizing a heater (not shown) provided inside the toilet seat 100. The deodorizing unit 650, the warm air unit 660, and the toilet seat heating unit 670 can be controlled based on e.g. the command from the remote control device 30 and the determination result of the usage determination part 535 of the determination part 530.

The seating sensor 700 is a sensor for detecting that a human body is seated on the toilet seat 100. For instance, the seating sensor 700 is a load sensor for detecting seating by a prescribed load applied to the toilet seat 100.

The seating sensor 700 does not necessarily need to detect only seating. For instance, the seating sensor 700 may be configured to detect both seating and unseating.

The toilet seat open/close sensor 800 is a sensor for detecting whether or not the toilet seat 100 is in the opened state. When the toilet seat 100 is opened to a prescribed angle, the toilet seat open/close sensor 800 detects that the toilet seat 100 is in the opened state. With regard to the opened/closed state of the toilet seat 100, the closed state is the state in which the toilet seat 100 is not in the opened state. When the toilet seat open/close sensor 800 detects that the toilet seat 100 is in the opened state, a signal is outputted to the toilet seat open/close determination part 534.

Here, the prescribed angle referred to herein is e.g. an angle of the toilet seat 100 opened to the state in which the toilet seat 100 does not fall by self-weight.

<Operation of the Doppler Sensor and the Control Section>

Next, a specific operation of the Doppler sensor and the control section of the toilet seat device according to an embodiment of the invention is described with reference to FIGS. 7 to 11.

Figure 7:
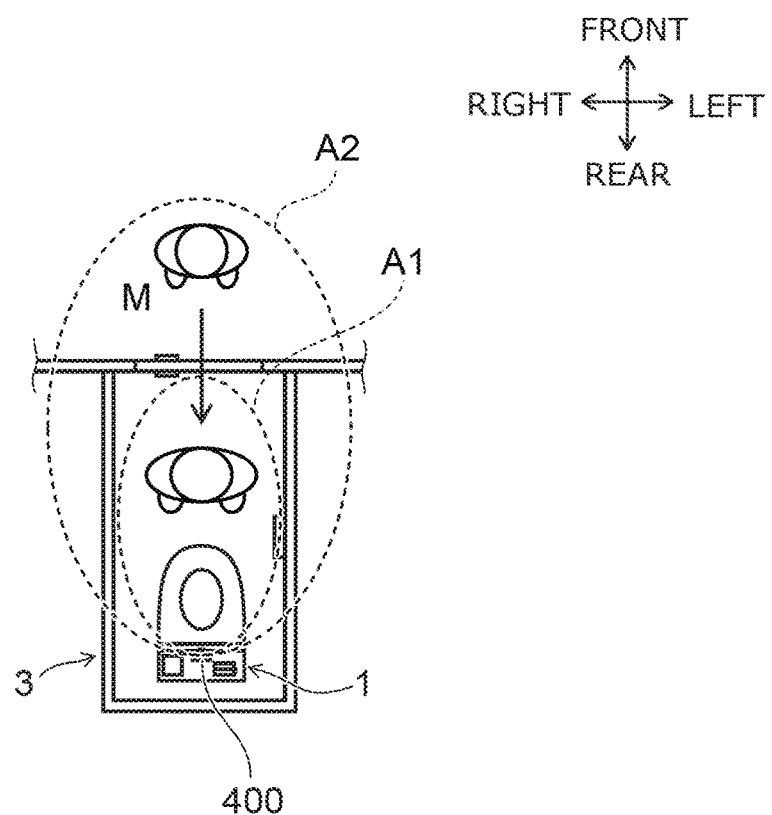
FIG. 7 is a plan view showing an example of sensing areas of the Doppler senor and the movement of a human body according to an embodiment of the invention.
Figure 8:
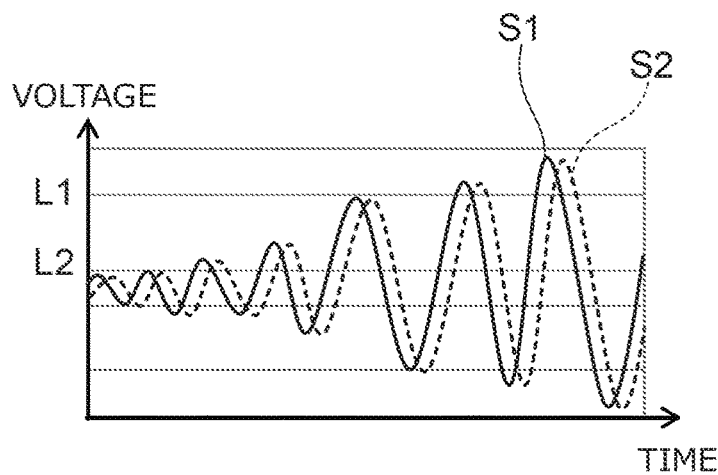
FIG. 8 is a graph showing a signal generated by the computation part or the mixer circuit in the example shown in FIG. 7.
Figure 9:
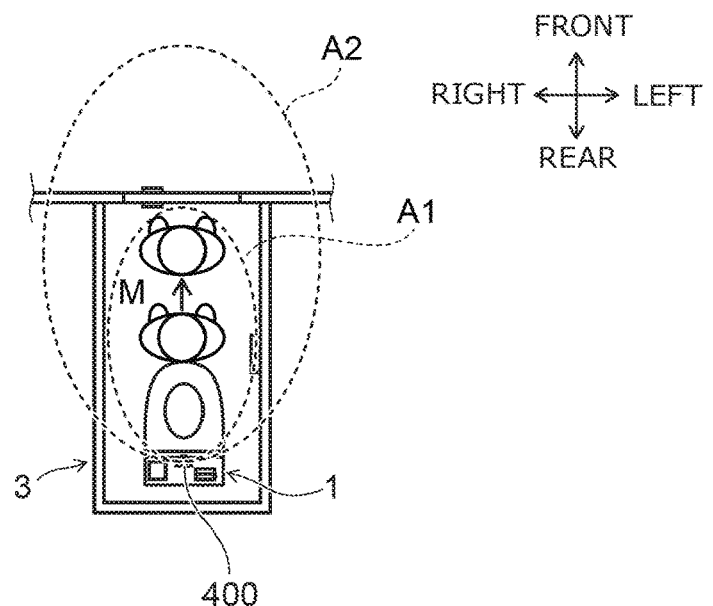
FIG. 9 is a plan view showing another example of sensing areas of the Doppler senor and the movement of a human body according to the embodiment of the invention.
Figure 10:
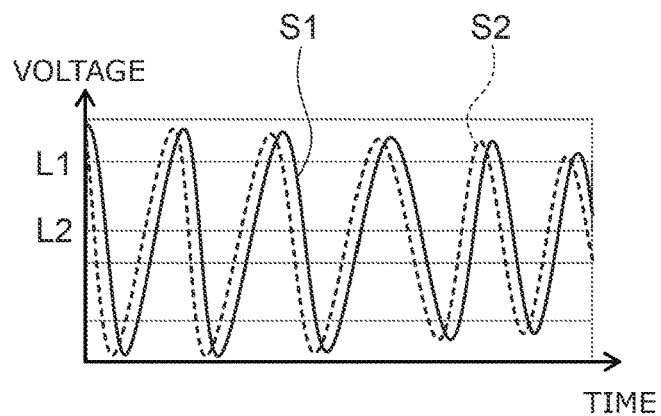
FIG. 10 is a graph showing a signal generated by the computation part or the mixer circuit in the example shown in FIG. 9.
Figure 11:
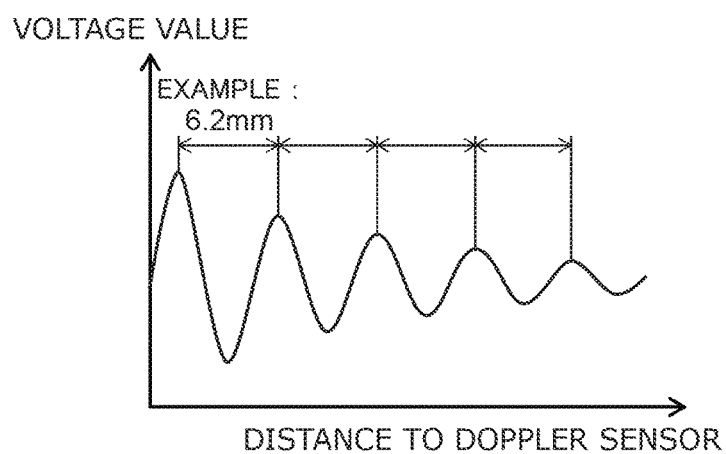
FIG. 11 is a graph illustrating the voltage value of the sensing signal regarding the motion leaving the toilet seat.

FIG. 7 is a plan view showing an example of sensing areas of the Doppler senor and the movement of a human body according to an embodiment of the invention. FIG. 8 is a graph showing a signal generated by the computation part or the mixer circuit in the example shown in FIG. 7. FIG. 9 is a plan view showing another example of sensing areas of the Doppler senor and the movement of a human body according to the embodiment of the invention. FIG. 10 is a graph showing a signal generated by the computation part or the mixer circuit in the example shown in FIG. 9. FIG. 11 is a graph illustrating the voltage value of the sensing signal regarding the motion leaving the toilet seat.

FIGS. 8 and 10 are graphs showing the voltage value calculated based on the sensing signal outputted from the Doppler sensor 400. In these FIGS. 8 and 10, the solid line represents the signal S1 based on the first transmission wave TW1, and the dashed line represents the signal S2 based on the second transmission wave TW2.

In the following, the signal S1 and the signal S2 may be collectively and simply referred to as signal S. In FIGS. 8 and 10, the thresholds (voltage levels) used to determine entry of a human body M into the toilet room 3 are represented by the first level L1 and the second level L2.

As shown in FIG. 7, a first sensing area A1 and a second sensing area A2 are formed in front of the toilet seat device 20 by the Doppler sensor 400. These sensing areas A1, A2 are regions in which the Doppler sensor 400 can sense a sensing target such as a human body M. The position and size of the formed sensing areas A1, A2 can be determined by e.g. the direction and intensity of radio waves emitted from the Doppler sensor 400.

The first sensing area A1 is a region formed on the front side of the Doppler sensor 400. For instance, the first sensing area A1 is formed to be as large as possible to the extent that it is fitted inside the toilet room 3. On the other hand, the second sensing area A2 is a region including the region outside the first sensing area A1. That is, the second sensing area A2 is a region larger than the first sensing area A1. For instance, the second sensing area A2 is set to be the largest size that can be detected by the Doppler sensor 400. Part of the second sensing area A2 may overlap the first sensing area A1. In the example shown in FIG. 7, the first sensing area A1 is entirely contained in the second sensing area A2.

Next, a determination method of the room-entering determination part 531 and the room-exiting determination part 532 is described in detail. The room-entering determination part 531 and the room-exiting determination part 532 use the intensity (amplitude) and the phase of the signal S as a determination criterion.

As shown in FIGS. 7 and 8, when a human body M moves from outside the toilet room 3 toward the door 7, the intensity (amplitude) of the signal S gradually increases. Upon detecting from the computation result of the computation part 520 that the intensity of the signal S has exceeded the second level L2, the room-entering determination part 531 determines that the human body M (e.g., user) has entered the second sensing area A2. Furthermore, upon detecting from the computation result of the computation part 520 that the intensity of the signal S has exceeded the first level L1 and that the signal S has an approaching phase of a human body M, the room-entering determination part 531 determines that the human body M has entered the toilet room 3 (entered the first sensing area A1) and approached the toilet seat 100. Thus, with regard to the threshold of the signal S used to determine entry of a human body M into the toilet room 3, the first level L1 and the second level L2 are set based on the intensity of the signal S in the first sensing area A1 and the second sensing area A2, respectively.

The determination of whether the signal S has an approaching phase or a leaving phase of a human body M is made by comparison between the signal S1 and the signal S2. When the human body M approaches the Doppler sensor 400, the maximum (or minimum) peak value of the wave of the signal S1 is detected earlier than that of the signal S2. In other words, the wave of the signal S is shaped so that the wave of the signal S2 follows the wave of the signal S1 at a time lag. On the contrary, when the human body M leaves the Doppler sensor 400, the maximum (or minimum) peak value of the wave of the signal S2 is detected earlier than that of the signal S1 (see FIG. 10).

As shown in FIGS. 9 and 10, when the human body M moves away from the Doppler sensor 400, the intensity (amplitude) of the signal S gradually decreases. Upon detecting from the computation result of the computation part 520 that the intensity of the signal S has fallen below the second level L2 and that the signal S has a leaving phase of a human body M, the room-exiting determination part 532 determines that the user has left the toilet room 3. The threshold of the intensity of the signal S used by the room-exiting determination part 532 only needs to be smaller than the first level L1. The threshold may be a value between the first level L1 and the second level L2, or a value smaller than the second level L2.

The comparison of the intensity of the signal S with the first level L1 or the second level L2 in the determination of the room-entering determination part 531 and the room-exiting determination part 532 may be set in accordance with any of the signal S1 and the signal S2.

The determination that the human body M has entered the toilet room 3 (entered the first sensing area A1) and approached the toilet seat 100 may be performed simply by detecting that the intensity of the signal S has exceeded the first level L1 without detecting that the signal S has an approaching phase of a human body M. Thus, approach of a human body M to the toilet seat 100 may be determined simply from the detection of the intensity of the signal S irrespective of the phase of the signal S (whether or not the signal S has an approaching phase). On the other hand, leaving of a human body M from the toilet seat 100 may be determined based on the intensity and phase of the signal S.

Next, a determination method of the leaving determination part 536 is described in detail. The leaving determination part 536 uses the phase of the signal S and the moving distance of the human body M (e.g., user) as a determination criterion.

Upon detecting from the computation result of the computation part 520 that the signal S has a leaving phase of a human body M and that the human body M has moved a prescribed distance, the leaving determination part 536 determines that the human body M has left the toilet seat 100.

Here, a method for calculating the moving distance of the human body M is described in detail.

The moving distance Ds of the human body M can be represented by the following equation (2).

$$Ds=(\lambda/2)\times(n-1) \quad (2)$$

where

λ: oscillation wavelength (wavelength of the radio wave emitted by the Doppler sensor)

n: number of waves within a prescribed time in the waveform of the voltage value of the sensing signal The oscillation wavelength is determined by the frequency (oscillation frequency) of the radio wave emitted by the Doppler sensor 400. Thus, the control section 500 can estimate the moving distance of the human body M (user) by counting the number of waves occurring in the waveform of the voltage value of the sensing signal.

The oscillation wavelength can be represented by the following equation (3). The symbol "c" and the symbol "Fs" are as described above with reference to equation (1).

$$\lambda=c/Fs \quad (3)$$

For instance, the speed of light c is $3\times10^8$ [m/s], and the oscillation frequency is set to 24.15 [GHz]. Then, the oscillation wavelength λ is $3\times10^8/(24.15\times10^9)\approx12.4$ [mm].

The time ΔT per wavelength of the sensing signal can be represented by the following equation (4). The symbol "ΔF" is as described above with reference to equation (1).

$$\Delta T=1/\Delta F \quad (4)$$

Thus, from the aforementioned equations (1), (3), and (4), the distance Dk per wavelength of the sensing signal can be represented by the following equation (5). The symbol "v" is as described above with reference to equation (1).

$$Dk=\Delta T\times v=\lambda/2 \quad (5)$$

That is, the length (distance) Dk per wavelength of the sensing signal means the moving distance of the human body M upon detection of one wavelength of the sensing signal. As described above, for instance, the speed of light c is $3\times10^8$ [m/s], and the oscillation frequency is set to 24.15 [GHz]. Then, the oscillation wavelength λ is 12.4 [mm]. Thus, as shown in FIG. 11, the length Dk per wavelength of the sensing signal in this case is 12.4/2=6.2 [mm].

Accordingly, the moving distance Ds of the human body M can be represented by the aforementioned equation (2).

For instance, the prescribed distance used to determine leaving from the toilet seat 100 by the leaving determination part 536 may be 200 [mm]. From equation (2), the number of waves in this case is 2×Ds/λ+1=2×200/12.4+1≈33 waves.

Thus, upon detecting that the signal S has a leaving phase of a human body M and counting 33 waves in the waveform of the voltage value of the sensing signal, the leaving determination part 536 determines that the human body M has left the toilet seat 100. Here, "33 waves" and "200 [mm]" described above are illustrative only. These values are not limited thereto, but can be set appropriately depending on the setting value of the oscillation frequency and the moving distance of the human body M.

<Operation Flow of the Toilet Device>

Next, an operation flow of the toilet seat device according to an embodiment of the invention is described with reference to FIGS. 12 to 17.

Figure 12:
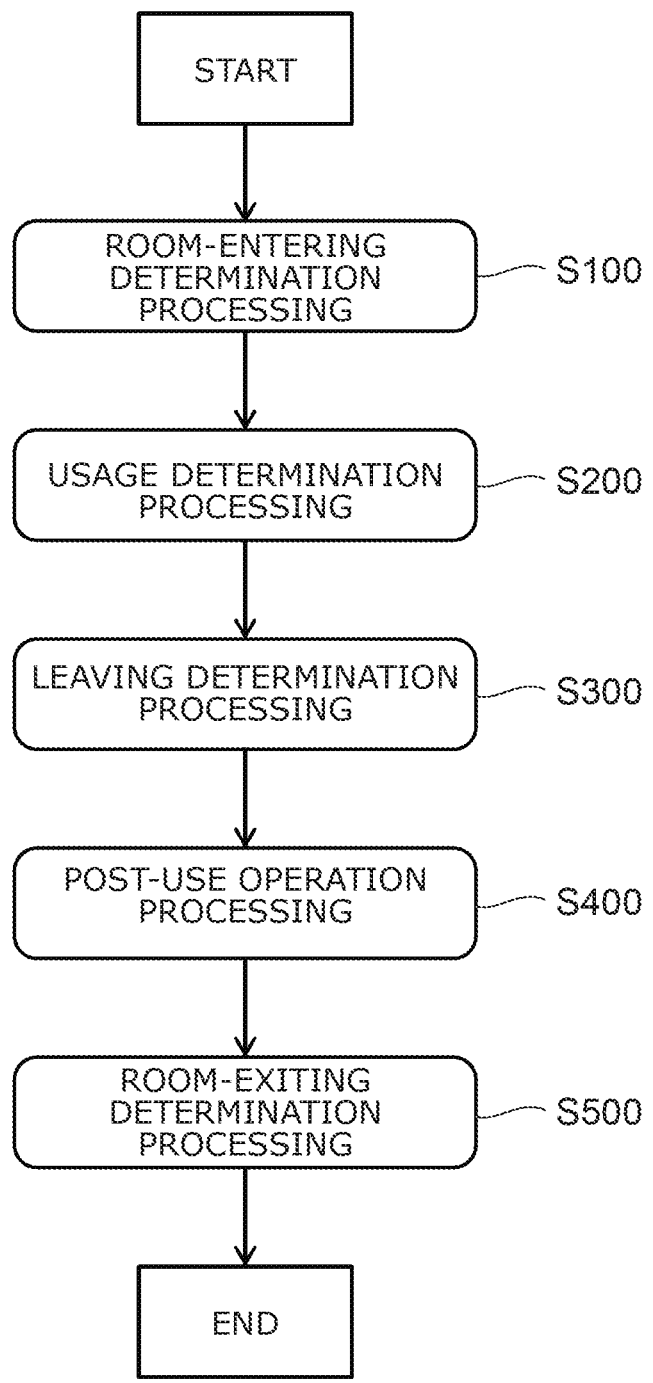
FIG. 12 is a flow chart showing the operation of the toilet seat device according to an embodiment of the invention.
Figure 13:
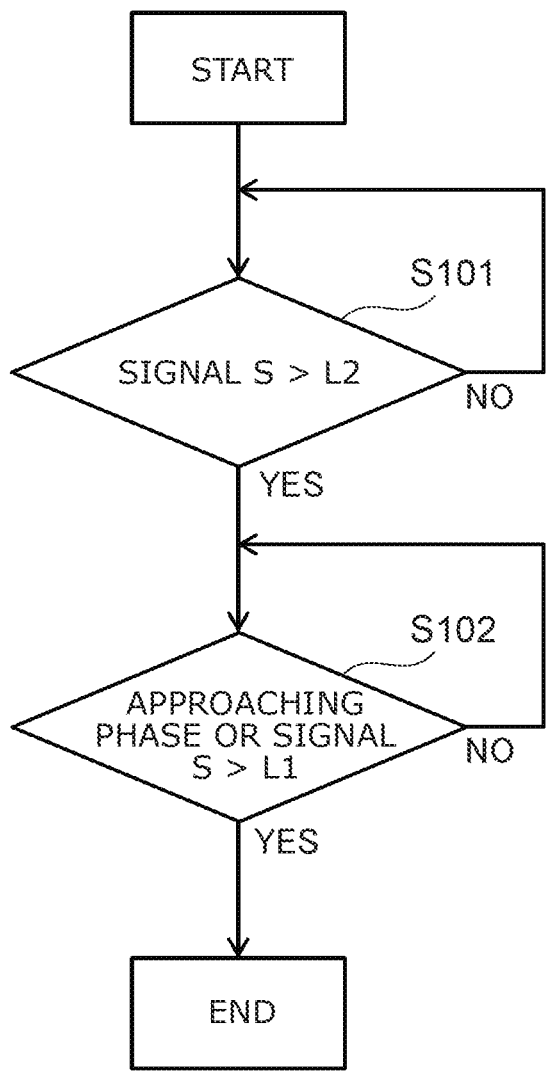
FIG. 13 is a flow chart showing the room-entering determination processing of the toilet seat device according to the embodiment of the invention.
Figure 14:
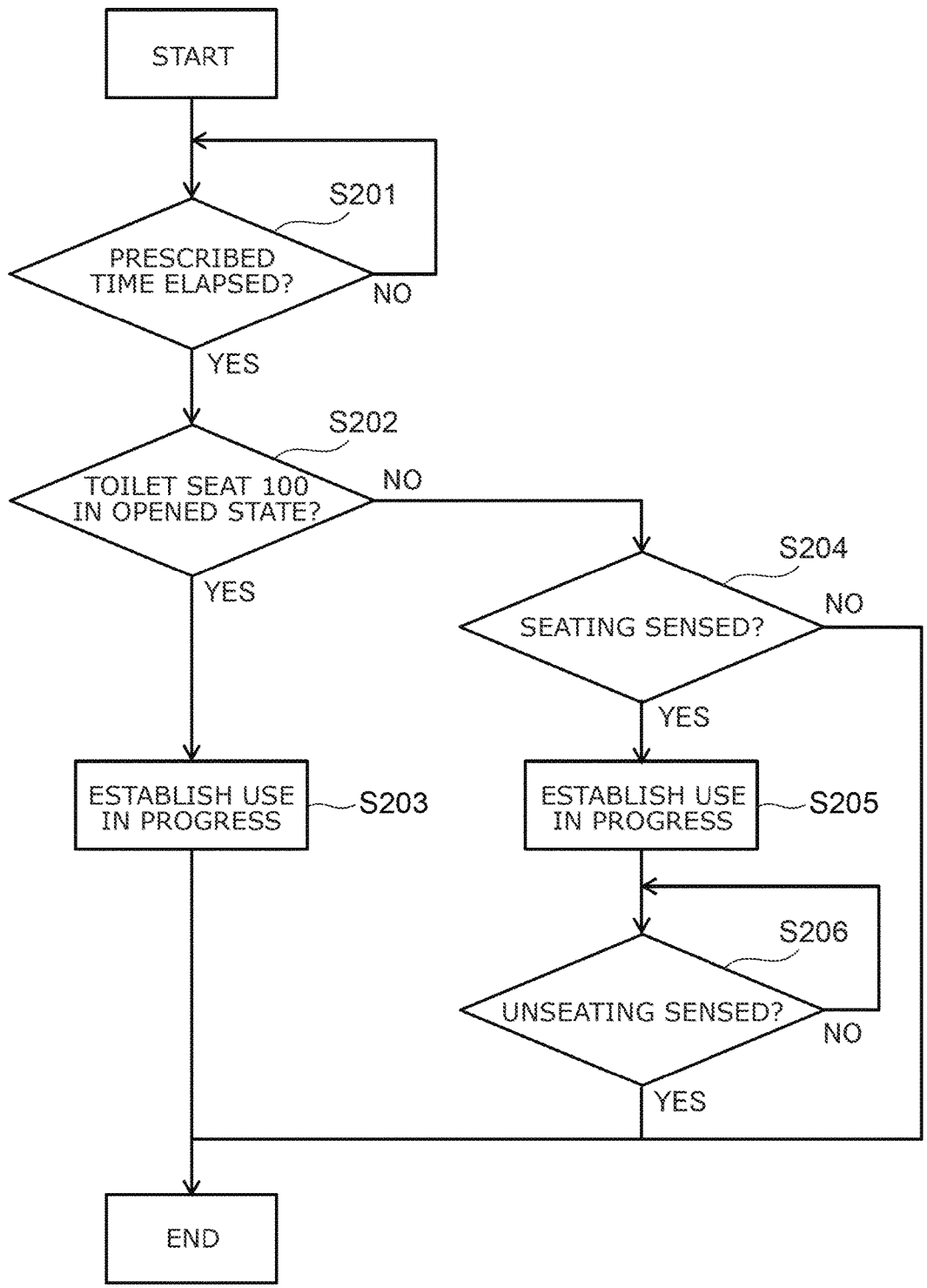
FIG. 14 is a flow chart showing the usage determination processing of the toilet seat device according to the embodiment of the invention.
Figure 15:
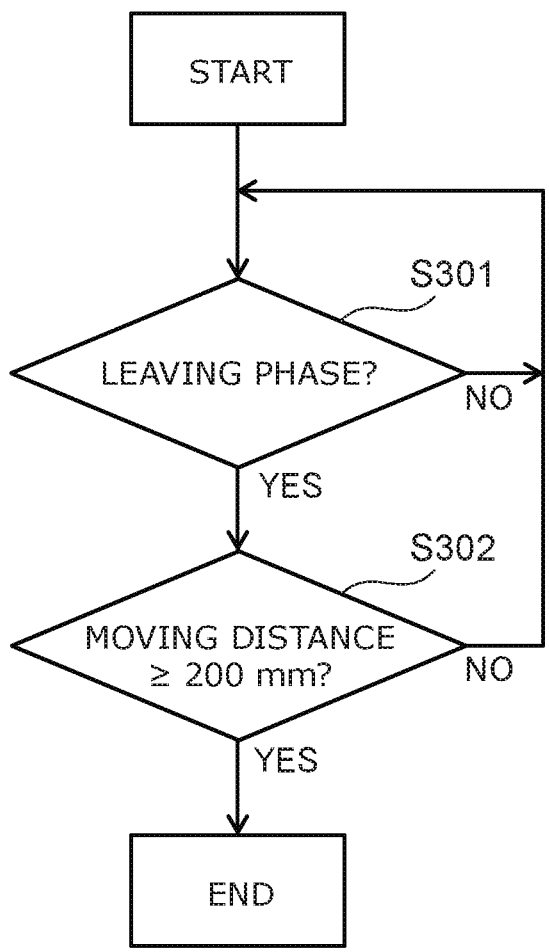
FIG. 15 is a flow chart showing the leaving determination processing of the toilet seat device according to the embodiment of the invention.
Figure 16:
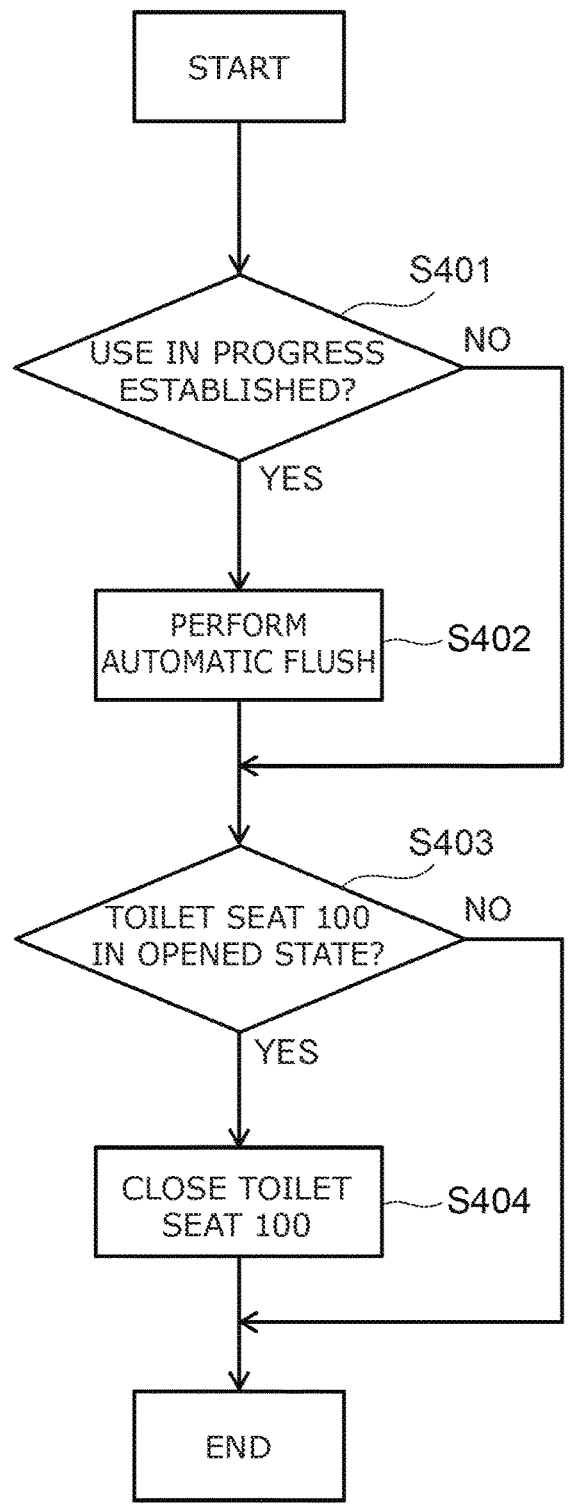
FIG. 16 is a flow chart showing the post-use operation processing of the toilet seat device according to the embodiment of the invention.
Figure 17:
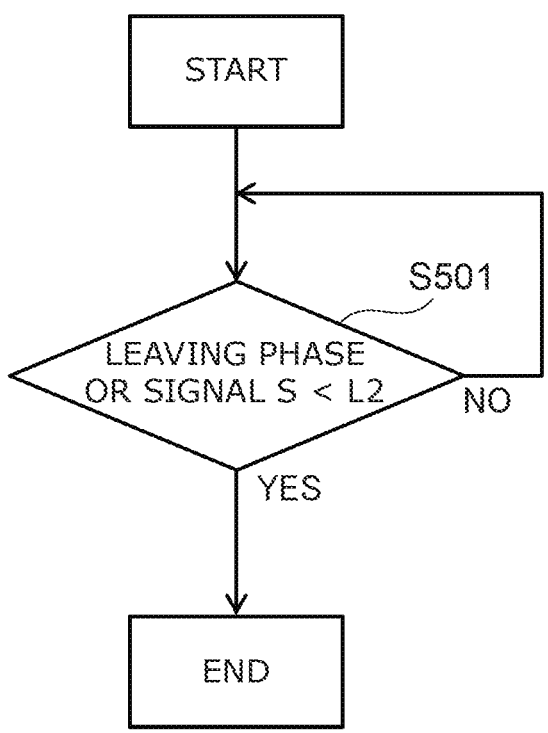
FIG. 17 is a flow chart showing the room-exiting determination processing of the toilet seat device according to the embodiment of the invention.

FIG. 12 is a flow chart showing the operation of the toilet seat device according to an embodiment of the invention. FIG. 13 is a flow chart showing the room-entering determination processing of the toilet seat device according to the embodiment of the invention. FIG. 14 is a flow chart showing the usage determination processing of the toilet seat device according to the embodiment of the invention. FIG. 15 is a flow chart showing the leaving determination processing of the toilet seat device according to the embodiment of the invention. FIG. 16 is a flow chart showing the post-use operation processing of the toilet seat device according to the embodiment of the invention. FIG. 17 is a flow chart showing the room-exiting determination processing of the toilet seat device according to the embodiment of the invention.

As shown in FIG. 12, the operation flow of the toilet device 1 begins with the room-entering determination processing of step S100. After the room-entering determination processing of step S100 is completed, the usage determination processing of step S200, the leaving determination processing of step S300, the post-use operation processing of step S400, and the room-exiting determination processing of step S500 are performed sequentially.

As shown in FIG. 13, the room-entering determination processing of step S100 is a processing composed of steps S101-S102. Entry into the toilet room 3 and approach of a user to the toilet seat 100 are sensed based on the sensing signal outputted by the Doppler sensor 400.

In the room-entering determination processing, first, the room-entering determination part 531 determines whether the voltage value of the signal S is larger than the second level L2 (step S101). If it is determined in step S101 that the voltage value of the signal S is larger than the second level L2, the control proceeds to step S102. The processing of step S101 is repeated until the condition that the voltage value of the signal S is larger than the second level L2 is satisfied.

In step S102, the room-entering determination part 531 determines whether the phase indicates approach to the toilet seat 100 and whether the voltage value of the signal S is larger than the first level L1. If it is determined in step S102 that the phase indicates approach to the toilet seat 100 and that the voltage value of the signal S is larger than the first level L1, then the room-entering determination processing is completed, and the control proceeds to the usage determination processing of step S200. The processing of step S102 is repeated until the condition that the phase indicates approach to the toilet seat 100 and that the voltage value of the signal S is larger than the first level L1 is satisfied.

In step S102, it may be determined only whether the voltage value of the signal S is larger than the first level L1 without determining whether the phase indicates approach to the toilet seat 100. That is, if it is determined in step S102 that the voltage value of the signal S is larger than the first level L1, then the room-entering determination processing may be completed, and the control may proceed to the usage determination processing of step S200. In this case, the processing of step S102 may be repeated until the condition that the voltage value of the signal S is larger than the first level L1 is satisfied.

As shown in FIG. 14, the usage determination processing of step S200 is a processing composed of steps S201-S206. The toilet seat open/close sensor 800 senses the opened/closed state of the toilet seat 100. If the toilet seat 100 is in the opened state, it is regarded that use is in progress for urination by the user. If the toilet seat 100 is in the closed state, that is, if the toilet seat 100 is not in the opened state, the seating sensor 700 senses seating of the user.

First, in step S201, the timing means 560 determines whether a prescribed time has lapsed from the completion of the room-entering determination processing. If it is determined in step S201 that the prescribed time has lapsed from the completion of the room-entering determination processing, the control proceeds to step S202. The processing of step S201 is repeated until the condition that the prescribed time has lapsed from the completion of the room-entering determination processing is satisfied.

The prescribed time referred to herein is a time required until the user exposes the private parts from clothing and is seated, or the user exposes the private parts from clothing and opens the toilet seat. The prescribed time is e.g. 30 seconds. This time can be set appropriately. This step S201 may be omitted.

In step S202, the toilet seat open/close sensor 800 senses the opened/closed state of the toilet seat 100. The toilet seat open/close determination part 534 determines whether the toilet seat 100 is in the opened state.

If it is determined in step S202 that the toilet seat 100 is in the opened state, the control proceeds to step S203. If it is determined in step S202 that the toilet seat 100 is not in the opened state, the control proceeds to step S204.

The opened state of the toilet seat 100 referred to herein is the state of the toilet seat 100 opened from the closed state when the room-entering determination processing for sensing approach of a user to the toilet seat 100 is completed based on the sensing signal outputted by the Doppler sensor 400. The transition from the closed state to the opened state of the toilet seat 100 may be caused e.g. by the user directly lifting up the toilet seat 100, or by the user operating the remote control device 30.

In step S203, the usage determination part 535 establishes use in progress. That is, it is regarded that use is in progress for urination by the user, and the usage determination processing is completed.

In step S204, the seating sensor 700 senses seating. The seating determination part 533 determines whether a user is seated on the toilet seat 100. If it is determined in step S204 that a user is seated on the toilet seat 100, the control proceeds to step S205. If it is determined in step S204 that a user is not seated on the toilet seat 100, then the usage determination processing is completed, and the control proceeds to the leaving determination processing of step S300.

In step S205, the usage determination part 535 establishes use in progress. That is, it is regarded that use is in progress for urination or defecation by the user, and the control proceeds to step S206.

In step S206, the seating determination part 533 determines whether the user seated on the toilet seat 100 is unseated. If it is determined in step S206 that the user is unseated, then the usage determination processing is completed, and the control proceeds to the leaving determination processing of step S300. If it is determined in step S206 that the user is not unseated, that is, the user is seated, then the processing of step S206 is repeated until the condition of sensing unseating is satisfied.

If the number of times of repeating the processing of step S206 reaches a prescribed number of times, that is, if the period of time of repeating the processing of step S206 reaches a prescribed period of time, then the operation may be completed by e.g. performing the post-use operation processing of step S400 without performing the room-exiting determination processing of step S500. This can complete the operation even if e.g. the seating sensor 700 is faulty.

As shown in FIG. 15, the leaving determination processing of step S300 is a processing composed of steps S301-S302. Leaving of a user from the toilet seat 100 is sensed based on the sensing signal outputted by the Doppler sensor 400.

First, in step S301, the leaving determination part 536 determines whether the signal S has a leaving phase based on the sensing signal outputted by the Doppler sensor 400. If it is determined in step S301 that the signal S has a leaving phase, the control proceeds to step S302. If it is determined that the signal S does not have a leaving phase (e.g., has an approaching phase), the processing of step S301 is repeated until the condition that the signal S has a leaving phase is satisfied.

In step S302, it is determined whether the user has moved not less than a prescribed distance such as 200 [mm]. If it is determined in step S302 that the user has moved 200 [mm] or more, then the leaving determination processing is completed, and the control proceeds to the post-use operation processing of step S400. If it is determined in step S302 that the user has not moved 200 [mm] or more, the control returns to step S301.

As described above, the prescribed distance of 200 [mm] referred to herein can be set appropriately depending on the setting value of the oscillation frequency and the moving distance of the user.

As shown in FIG. 16, the post-use operation processing of step S400 is a processing composed of steps S401-S404. A post-use operation is performed when the usage determination processing of step S200 has established usage, that is, it is regarded that use is in progress.

First, in step S401, it is determined whether the usage determination part 535 has established usage by a user. In other words, it is determined whether the processing of step S203 or step S205 of the usage determination processing has been performed. If it is determined in step S401 that the usage determination part 535 has established usage by a user, the control proceeds to step S402. If it is determined in step S401 that the usage determination part 535 has not established usage by a user, the control proceeds to step S403.

In step S402, the toilet stool flushing unit 640 flushes the bowl part 11. Thus, e.g. urine or dirt excreted by the user is ejected to the outside of the toilet stool 10. Specifically, a signal is outputted from the determination part 530 to the driving control part 550. Then, a command signal is outputted from the driving control part 550 to the toilet stool flushing unit 640 to flush the bowl part 11 (to supply flush water from a feed water source, not shown, to the bowl part). When step S402 is completed, the control proceeds to step S403.

In step S403, the toilet seat open/close sensor 800 senses the opened/closed state of the toilet seat 100. The toilet seat open/close determination part 534 determines whether the toilet seat 100 is in the opened state. If it is determined in step S403 that the toilet seat 100 is in the opened state, the control proceeds to step S404. If it is determined in step S403 that the toilet seat 100 is not in the opened state, then the post-use operation processing is completed, and the control proceeds to the room-exiting determination processing of step S500.

In step S404, the toilet seat opening/closing unit 610 performs the operation of closing the toilet seat 100. Specifically, a signal is outputted from the determination part 530 to the driving control part 550. Then, a command signal is outputted from the driving control part 550 to the toilet seat opening/closing unit 610 to close the toilet seat 100. If step S404 is completed, then the post-use operation processing is completed, and the control proceeds to the room-exiting determination processing of step S500. As described above, the operation of flushing the bowl part 11 and the operation of closing the toilet seat 100 performed in the post-use operation processing are examples of the post-use operation. That is, the post-use operation performed by the toilet seat device 20 is a prescribed operation performed by one of the units of the controlled section 600 after a prescribed condition for determining completion of use of the toilet device 1 by the user is satisfied in the control by the control section 500. Other examples of the post-use operation are the operation of cleaning the nozzle of the private part cleaning unit 630, the operation of stopping the toilet seat heating unit 670, the operation of spraying wash water or sterilization water from the private part cleaning unit 630 to the bowl part 11, the operation of starting the deodorizing unit 650 or raising the deodorization intensity, and the operation of closing the toilet lid 200 (after closing the toilet seat 100). Another example is the operation of turning off or switching the illuminance of a lighting unit (not shown) installed in e.g. the toilet room 3. Still another example is the operation of turning off the backlight or switching the display of the display screen (not shown) of the remote control device 30.

As shown in FIG. 17, the room-exiting determination processing of step S500 is a processing composed of step S101. Leaving from the toilet room 3 is sensed based on the sensing signal outputted by the Doppler sensor 400.

First, in step S501, the room-exiting determination part 532 determines whether the phase indicates leaving from the toilet seat 100 and whether the voltage value of the signal S is smaller than the second level L2. If it is determined in step S501 that the phase indicates leaving from the toilet seat 100 and that the voltage value of the signal S is smaller than the second level L2, the room-exiting determination processing is completed. The processing of step S501 is repeated until the condition that the phase indicates leaving from the toilet seat 100 and that the voltage value of the signal S is smaller than the second level L2 is satisfied.

In the toilet seat device 20 according to the embodiment of the invention described above, the opened/closed state of the toilet seat 100 is sensed on the condition that approach of a user to the toilet seat 100 is sensed based on the sensing signal outputted by the Doppler sensor 400. It is regarded that use is in progress for urination by the user when the toilet seat 100 is in the opened state, that is, on the condition that the toilet seat 100 is in the opened state. The post-use operation is performed after leaving of the user from the toilet seat 100 is sensed based on the sensing signal. Thus, the sensing information of the Doppler sensor 400 is not used to determine whether use is in progress. This can suppress malfunctions such as closing the toilet seat 100 during use for urination by the user and flushing the toilet stool without use by the user due to erroneous sensing of the Doppler sensor 400.

In the toilet seat device 20 according to the embodiment of the invention described above, seating of the user is sensed when the toilet seat 100 is in the closed state, that is, on the condition that the toilet seat 100 is in the closed state. When seating of the user is sensed, that is, on the condition that seating of the user is sensed, the post-use operation is performed after sensing unseating of the user and leaving of the user from the toilet seat 100 based on the sensing signal. Thus, the toilet seat device 20 can be operated in accordance with the motion of the user. Accordingly, the user can use the toilet seat device 20 more comfortably.

Furthermore, in the toilet seat device 20 according to the embodiment of the invention described above, the opened/closed state of the toilet seat 100 is sensed after a prescribed period of time after approach of the user to the toilet seat 100 is sensed based on the sensing signal outputted by the Doppler sensor 400. Thus, for instance, in the case where the toilet seat 100 has already been in the opened state when the user approaches it, the toilet seat device 20 can be operated in accordance with one of use of the toilet seat 100 as opened and use of the toilet seat 100 after being closed. Accordingly, the user can use the toilet seat device more comfortably.

In the toilet seat device 20 according to the embodiment of the invention described above, the opened state of the toilet seat 100 is a state in which the toilet seat 100 is opened from the closed state after approach of the user to the toilet seat 100 is sensed based on the sensing signal outputted by the Doppler sensor 400. Thus, urination of the user can be sensed more accurately. This can further suppress malfunctions such as closing the toilet seat 100 during use for urination by the user and flushing the toilet stool without use by the user due to erroneous sensing of the Doppler sensor 400.

Furthermore, in the toilet seat device 20 according to the embodiment of the invention described above, the toilet seat 100 is closed immediately after the user uses and leaves the toilet seat device 20. This spares the next user the operation of closing the toilet seat 100. Accordingly, the user can use the toilet seat device 20 more comfortably.

<Alternative Embodiment>

Next, an operation flow of the toilet seat device according to an alternative embodiment of the invention is described with reference to FIG. 18.

In the operation flow of the toilet seat device according to the alternative embodiment, the flow other than the usage determination processing is identical to the operation flow of the embodiment of the invention described above, and thus the description thereof is omitted.

Figure 18:
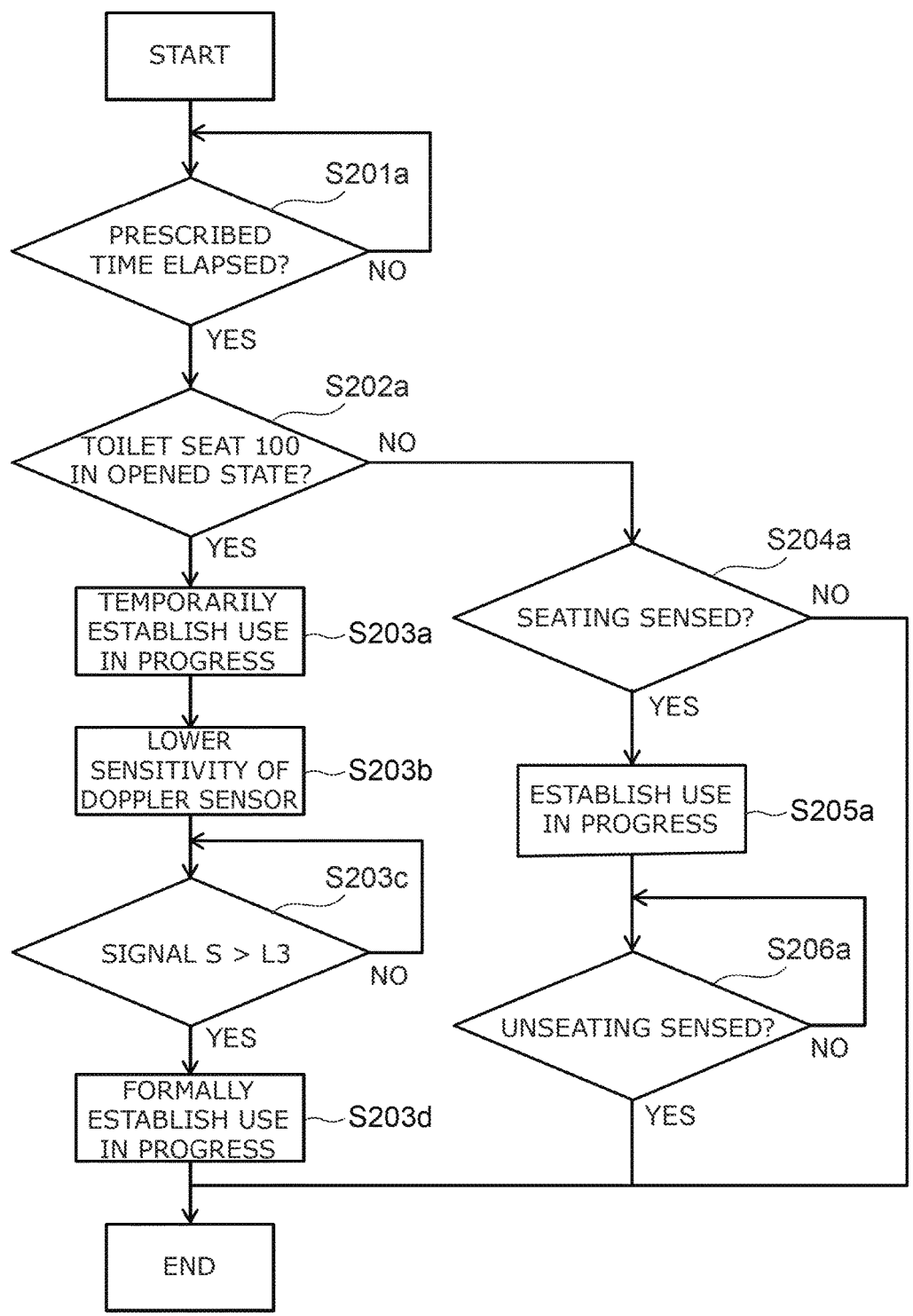
FIG. 18 is a flow chart showing the usage determination processing of the toilet seat device according to the alternative embodiment of the invention.

FIG. 18 is a flow chart showing the usage determination processing of the toilet seat device according to the alternative embodiment of the invention.

As shown in FIG. 18, the usage determination processing according to the alternative embodiment is a processing composed of steps S201a-S206a. The toilet seat open/close sensor 800 senses the opened/closed state of the toilet seat 100. If the toilet seat 100 is in the opened state, it is regarded that use is in progress for urination by the user. Then, the sensing sensitivity of the Doppler sensor 400 is maintained or lowered, and a formal determination is performed to determine whether use is in progress by the user again based on the sensing signal of the Doppler sensor 400. On the other hand, if the toilet seat 100 is in the closed state, that is, if the toilet seat 100 is not in the opened state, the seating sensor 700 senses seating of the user.

First, in step S201a, the timing means 560 determines whether a prescribed time has lapsed from the completion of the room-entering determination processing. If it is determined in step S201a that the prescribed time has lapsed, the control proceeds to step S202a. In step S201a, the processing of step S201 is repeated until the condition that the prescribed time has lapsed from the completion of the room-entering determination processing is satisfied.

The prescribed time referred to herein is a time required until the user exposes the private parts from clothing and is seated, or the user exposes the private parts from clothing and opens the toilet seat. The prescribed time is e.g. 30 seconds. This time can be set appropriately. This step S201a may be omitted.

In step S202a, the toilet seat open/close sensor 800 senses the opened/closed state of the toilet seat 100. The toilet seat open/close determination part 534 determines whether the toilet seat 100 is in the opened state. If it is determined in step S202a that the toilet seat 100 is in the opened state, the control proceeds to step S203a. If it is determined in step S202a that the toilet seat 100 is not in the opened state, the control proceeds to step S204a.

The opened state of the toilet seat 100 referred to herein is the state of the toilet seat 100 opened from the closed state when the room-entering determination processing for sensing approach of a user to the toilet seat 100 is completed based on the sensing signal outputted by the Doppler sensor 400. The transition from the closed state to the opened state of the toilet seat 100 may be caused e.g. by the user directly lifting up the toilet seat 100, or by the user operating the remote control device 30.

In step S203a, the usage determination part 535 temporarily establishes use in progress for urination, and the control proceeds to step S203b. That is, it is determined in step S202a that the toilet seat 100 is in the opened state, and it is accordingly determined that use is in progress for urination by the user. This determination is the temporal determination performed before the aforementioned formal determination.

In step S203b, the sensitivity of the Doppler sensor 400 is lowered, and the control proceeds to step S203c. Alternatively, the sensitivity of the Doppler sensor 400 may be maintained without being lowered. Here, maintaining or lowering the sensitivity of the Doppler sensor 400 is referred to in comparison with the sensitivity of the Doppler sensor 400 at the time of sensing approach to the toilet seat 100 in the room-entering determination processing (step S102).

In step S203c, based on the sensing signal outputted by the Doppler sensor 400, the usage determination part 535 determines whether the voltage value of the signal S is larger than a third level L3. The third level L3 is a threshold higher than the first level L1. If it is determined in step S203c that the voltage value of the signal S is larger than the third level L3 (threshold higher than the first level L1), the control proceeds to step S203d. The processing of step S203c is repeated until the condition that the voltage value of the signal S is larger than the third level L3 is satisfied. Specific motions of the user corresponding to this determination processing of step S203c include e.g. the motion of the user exposing the private parts from clothing before urination, the motion of the user approaching the toilet stool before urination, and the motion of the user putting back the private parts into clothing after urination.

In step S203c, the third level L3 may be replaced by e.g. the first level L1 used in the room-entering determination processing.

In step S203d, the usage determination part 535 formally establishes use in progress and completes the usage determination processing. Thus, after the temporary determination, the sensitivity of the Doppler sensor 400 is maintained or lowered. Then, based on the sensing signal of the Doppler sensor 400, the formal determination is performed to confirm the presence of the user engaged in urination.

In step S204a, the seating sensor 700 senses seating. The seating determination part 533 determines whether a user is seated on the toilet seat 100. If it is determined in step S204a that a user is seated on the toilet seat 100, the control proceeds to step S205a. If it is determined in step S204a that a user is not seated on the toilet seat 100, then the usage determination processing is completed, and the control proceeds to the leaving determination processing of step S300.

In step S205a, the usage determination part 535 establishes use in progress.

That is, it is regarded that use is in progress for urination or defecation by the user, and the control proceeds to step S206a.

In step S206a, the seating determination part 533 determines whether the user seated on the toilet seat 100 is unseated. If it is determined in step S206a that the user is unseated, then the usage determination processing is completed, and the control proceeds to the leaving determination processing of step S300. If it is determined in step S206a that the user is not unseated, that is, the user is seated, then the processing of step S206a is repeated until the condition of sensing unseating is satisfied.

Also in this embodiment, if the number of times of repeating the processing of step S206a reaches a prescribed number of times, that is, if the period of time of repeating the processing of step S206a reaches a prescribed period of time, then the operation may be completed by e.g. performing the post-use operation processing of step S400 without performing the room-exiting determination processing of step S500. This can complete the operation even if e.g. the seating sensor 700 is faulty.

In the toilet seat device 20 according to the alternative embodiment of the invention described above, in addition to the effect of the embodiment of the invention described above, the opened/closed state of the toilet seat 100 is sensed after a prescribed period of time after approach of the user to the toilet seat 100 is sensed based on the sensing signal outputted by the Doppler sensor 400. If it is regarded that use is in progress for urination by the user when the toilet seat is in the opened state, then the sensitivity of the Doppler sensor is maintained or lowered, and a formal determination is performed to determine whether use is in progress by the user again based on the sensing signal of the Doppler sensor. Thus, after the opened/closed state of the toilet seat 100 is sensed, sensing is further performed with the sensitivity of the Doppler sensor 400 maintained or lowered. This can confirm that the user (human body) is present near the toilet seat 100 (or has come nearer to the toilet seat 100) after the opened state of the toilet seat 100 is sensed. Thus, urination of the user can be determined more accurately even if e.g. the user enters the toilet room 3 when the toilet seat 100 is in the opened state. This can further suppress malfunctions such as closing the toilet seat 100 during use for urination by the user and flushing the toilet stool without use by the user.

<Variations>

The embodiment of the invention has been described above. However, the invention is not limited to the aforementioned embodiment.

For instance, the antenna part 410 may be divided into an antenna part connected to the transmitter part 420 and an antenna part connected to the receiver part 430.

The seating sensor 700 may be omitted. The determination of seating or unseating of the user by the seating determination part 533 may be performed based on the sensing signal of the Doppler sensor 400.

In the embodiment, the first transmission wave TW1 and the second transmission wave TW2 are emitted, and the phases of the two transmission waves are shifted to determine whether the phase is the approaching phase or leaving phase of the user. However, the second transmission wave may be replaced by the reflection wave RW of the transmission wave TW. That is, the phase of the reflection wave (RW) may be shifted by e.g. $\lambda/4$ relative to the phase of the transmission wave TW to determine whether the phase is the approaching phase or the leaving phase.

The units may be operated based on the result of the determination parts. For instance, in proceeding from the room-entering determination processing (step S100) to the usage determination processing (step S200), the toilet lid opening/closing unit 620 may be operated to open the toilet lid 200, and the toilet seat heating unit 670 may be operated to heat the toilet seat 100. When the seating determination part 533 determines that the user is seated, e.g. the deodorizing unit 650 may be operated.

The opened state of the toilet seat 100 in the usage determination processing may not be the state of the toilet seat 100 opened from the closed state when the room-entering determination processing for sensing approach of a user to the toilet seat 100 is completed based on the sensing signal outputted by the Doppler sensor 400. The opened state of the toilet seat 100 in the usage determination processing may be e.g. the opened state of the toilet seat 100 after a prescribed period of time (after step S102) after the room-entering determination processing is completed.

The toilet lid 200 may be controlled to be closed after a prescribed period of time after the room-exiting determination processing of step S500 is completed. The prescribed period of time referred to herein is e.g. 90 seconds.

Various components in the aforementioned embodiments can be combined with each other as long as technically feasible. Such combinations are also encompassed within the scope of the invention as long as they include the features of the invention.

What is claimed is:

1. A toilet seat device comprising:
   a toilet seat;
   a toilet seat open/close sensor which senses whether the toilet seat is in an opened state or a closed state;
   a Doppler sensor using radio waves; and
   a controller,
   the controller being capable of performing
      a room-entering determination process of sensing approach of a user to the toilet seat based on a sensing signal outputted from the Doppler sensor,
      a usage determination process of determining urination when it is sensed that the toilet seat is in the opened state, after the room-entering determination process, based on a sensing signal outputted by the toilet seat open/close sensor,
      a leaving determination process of sensing that the user leaves from the toilet seat, after the use determination process, based on the sensing signal outputted by the Doppler sensor, and
      an post-use operation process of outputting a flushing signal for flushing a bowl part of a toilet stool after the leaving determination process,
   the controller performing the post-use operation process when it is sensed by the leaving determination process that the user leaves from the toilet seat after determining urination in the usage determination process,
   the controller not performing the post-use operation process when it is sensed by the leaving determination process that the user leaves from the toilet seat after not determining urination in the usage determination process.

2. The device according to claim 1 further comprising a seating sensor which senses whether or not the user is seated on the toilet seat,
   the controller performing the post-use operation process when the toilet seat open/close sensor does not sense the opened state of the toilet seat during the usage determination process and when it is sensed by the leaving determination process that the user leaves the toilet seat after the seating sensor senses the seating of the user,
   the controller not performing the post-use operation process when the toilet seat open/close sensor does not sense the opened state of the toilet seat during the usage determination process and when it is sensed by the leaving determination process that the user leaves the toilet seat after the seating sensor does not sense the seating of the user.

3. The device according to claim 1, wherein, in the usage determination process, at least one of the opened state and the closed state of the toilet seat is sensed by the toilet seat open/close sensor after a prescribed period of time after the approach of the user to the toilet seat is sensed based on the sensing signal outputted by the Doppler sensor in the room-entering determination process.

4. The device according to claim 1, wherein the opened state of the toilet seat is a state in which the toilet seat is opened from the closed state after the approach of the user to the toilet seat is sensed based on the sensing signal outputted by the Doppler sensor.

5. The device according to claim 3, wherein, in the usage determination process, when the opened state of the toilet seat is sensed and it is regarded that use is in progress for urination by the user, sensing sensitivity of the Doppler sensor is maintained or lowered, and a formal determination is performed to determine whether use is in progress by the user again based on the sensing signal of the Doppler sensor.

6. The device according to claim 1, wherein the post-use operation is an operation of closing the toilet seat.

7. A toilet device comprising:
   a toilet stool; and
   the toilet seat device according to claim 1.

8. A toilet device comprising:
   a toilet stool including a bowl part and being capable of flushing the bowl part;
   a toilet seat provided on the toilet stool;
   a toilet seat open/close sensor which senses whether the toilet seat is in an opened state or a closed state;
   a Doppler sensor using radio waves; and
   a controller,
   the controller being capable of performing
      a room-entering determination process of sensing approach of a user to the toilet seat based on a sensing signal outputted from the Doppler sensor,
      a usage determination process of determining urination when it is sensed that the toilet seat is in the opened state, after the room-entering determination process, based on a sensing signal outputted by the toilet seat open/close sensor,
      a leaving determination process of sensing that the user leaves from the toilet seat, after the use determination process, based on the sensing signal outputted by the Doppler sensor, and
      an post-use operation process of outputting a flushing signal to the toilet stool after the leaving determination process, the toilet stool flushing the bowl part when receives the flushing single,
   the controller performing the post-use operation process when it is sensed by the leaving determination process that the user leaves from the toilet seat after determining urination in the usage determination process,
   the controller not performing the post-use operation process when it is sensed by the leaving determination process that the user leaves from the toilet seat after not determining urination in the usage determination process.

\* \* \* \* \*